(12) United States Patent
Sakota (10) Patent No.: US 9,174,724 B2
(45) Date of Patent: Nov. 3, 2015

(54) DEPLOYMENT MECHANISM

(71) Applicant: AIRBUS OPERATIONS LIMITED, Bristol (GB)

(72) Inventor: Nebojsa Sakota, Bristol (GB)

(73) Assignee: Airbus Operations Limited, Bristol (GB)

( * ) Notice: Subject to any disclaimer, the term of this patent is extended or adjusted under 35 U.S.C. 154(b) by 66 days.

(21) Appl. No.: 14/082,327

(22) Filed: Nov. 18, 2013

(65) Prior Publication Data

US 2014/0138481 A1 May 22, 2014

(30) Foreign Application Priority Data

Nov. 20, 2012 (GB) .................................. 1220885.6

(51) Int. Cl.
| | |
|---|---|
| *B64C 9/22* | (2006.01) |
| *B64C 13/50* | (2006.01) |
| *B64C 13/28* | (2006.01) |
| *B64C 9/24* | (2006.01) |

(52) U.S. Cl.
CPC . *B64C 13/50* (2013.01); *B64C 9/22* (2013.01); *B64C 9/24* (2013.01); *B64C 13/28* (2013.01); *Y02T 50/44* (2013.01)

(58) Field of Classification Search
CPC ............ B64C 9/22; B64C 9/24; B64C 13/50; B64C 13/28
USPC ....................................................... 244/99.3
See application file for complete search history.

(56) References Cited

U.S. PATENT DOCUMENTS

| | | | |
|---|---|---|---|
| 3,363,859 A | 1/1968 | Watts | |
| 3,404,580 A | 10/1968 | Valenti | |
| 2009/0146016 A1 | 6/2009 | Kordel et al. | |
| 2010/0192715 A1 | 8/2010 | Vauchel et al. | |

FOREIGN PATENT DOCUMENTS

| | | | | |
|---|---|---|---|---|
| DE | 1338506 | * | 8/2003 | ................ B64C 9/22 |
| EP | 1 338 506 | | 8/2003 | |
| EP | 1 731 421 | | 12/2006 | |
| EP | 2 460 722 | | 6/2012 | |
| EP | 2 532 583 | | 12/2012 | |
| FR | 2 917 788 | | 12/2008 | |
| GB | 2 272 205 | | 5/1994 | |
| GB | 2272205 | * | 5/1994 | ................ B66F 3/08 |

OTHER PUBLICATIONS

UK Search Report for GB Application No. 1220885.6, dated Mar. 18, 2013, Hal Young, 1 page.

* cited by examiner

*Primary Examiner* — Justin Benedik
(74) *Attorney, Agent, or Firm* — Nixon & Vanderhye P.C.

(57) ABSTRACT

The invention provides a deployment mechanism 60 for deploying an auxiliary wing surface device 30 from an aircraft wing body 20, the deployment mechanism providing a first connector portion 75, 576 for connecting the deployment mechanism to the aircraft wing body, a second connector portion 65 for connecting the deployment mechanism to the auxiliary wing surface device, and a telescopic rod 61 linking the first and second connector portions, the telescopic rod comprising an inner rod 64 extendable from inside of an outer rod 63 to increase the length of the telescopic rod, such that the distance between the first and second connector portions can be increased. The invention also provides an aircraft wing 10, 510, an aircraft and a method of operating an aircraft.

19 Claims, 5 Drawing Sheets

DEPLOYMENT MECHANISM

This application claims priority to UK Application No. 1220885.6 filed 20 Nov. 2012, the entire content of which is hereby incorporated by reference.

BACKGROUND OF THE INVENTION

The present invention concerns deployment mechanisms for use on aircraft wings. More particularly, but not exclusively, this invention concerns deployment mechanisms for deploying an auxiliary wing surface device from an aircraft wing body. The invention also concerns aircraft wings, an aircraft and methods of operating aircraft.

Modern aircraft wings are designed to maximise the angle of attack during take-off and landing operations. This often involves the wing having high-lift devices, with air-profiled surfaces, that can be extended and retracted along a pre-defined path in relation to the main wing body. These devices can be extended from the leading edge or from the trailing edge of the main wing body.

Prior art methods of deploying the high-lift devices generally comprise a power drive unit, gears, rotary (or possibly linear) actuators, a drive shaft, rotation control sensors and a set of linkages. This makes them bulky, heavy and complicated. An alternative method that has been used to deploy a trailing edge flap comprises a flap track beam with a mechanical gear and ball screw spindle attached to it. A ball nut is attached to the flap using a gimble arrangement. Movement of the nut along the stationary spindle deploys the flap and the gimble arrangement allows the flap to rotate into the desired orientation.

There are three main types of high-lift device; slats, drooped noses and Krueger flaps. Krueger flaps are generally used on a leading edge of a main wing body which is designed to maximise laminar flow along the upper wing surface. A typical Krueger flap, in its retracted position, forms at least part of the leading edge of the main wing body. This means that the profile of the Krueger flap is blended with the lower profile of the leading edge. This means that laminar flow when the flap is stowed (i.e. during cruise) is not disturbed.

However, as Krueger flaps are often used with narrow profiled wings designed for laminar flow, and because the Krueger flap stows within the profile of the wing, the deployment mechanisms needed to extend and retract the Krueger flaps need to be small. A small size of deployment mechanism is also needed so that a minimum required clearance to other systems in the wing (for example in the leading edge of the wing) and to other structures (e.g. a fuel tank) in the wing can be achieved.

The present invention seeks to mitigate the above-mentioned problems. Alternatively or additionally, the present invention seeks to provide an improved deployment mechanism, especially for a Krueger flap.

SUMMARY OF THE INVENTION

The present invention provides, according to a first aspect, a deployment mechanism for deploying an auxiliary wing surface device from an aircraft wing body, the deployment mechanism providing a first connector portion for connecting the deployment mechanism to the aircraft wing body, a second connector portion for connecting the deployment mechanism to the auxiliary wing surface device, and a telescopic rod linking the first and second connector portions, the telescopic rod comprising an inner rod extendable from inside of an outer rod to increase the length of the telescopic rod, such that the distance between the first and second connector portions can be increased.

Having a telescopic rod allows the deployment mechanism to have a large stroke length (to deploy the device) whilst still taking up less space in the aircraft wing body than prior art deployment mechanisms, which are much more bulky, heavy and complicated. The deployment mechanism is usually housed completely inside the profile of the aircraft wing when it is stowed. The deployment mechanism can even be used in narrow profile wings, where space is limited, and still leave enough room for other systems and structures to be installed.

Also, the deployment mechanism only needs a single connection point to the aircraft wing body and a single connection point to the auxiliary wing surface device. This gives a further weight and space saving.

When the deployment mechanism deploys the auxiliary wing surface device, it causes only a small drag effect.

The deployment mechanism has less failure paths than prior art mechanisms due to the smaller number of parts and simpler mechanism. This increases the service life of the deployment mechanism. The small size of the deployment mechanism also means that access for maintenance and inspection is easier.

In addition, the deployment mechanism may be attached to a spar of the aircraft wing body, and also may be attached near an upper cover of the aircraft wing body, both of which are advantageous in terms of the structural support required for the mechanism.

The deployment mechanism may be designed to take high loads from the auxiliary wing surface device and thus allow the device to be used during high-speed operations (such as being used as an additional air brake during cruise) as well as low-speed operations (such as during landing and take-off).

Preferably, the outer rod has an internally threaded portion corresponding to an externally threaded portion of the inner rod, such that the inner rod is extendable from inside the outer rod by a screw action of the threaded portions.

Preferably, the telescopic rod comprises an innermost rod, an outermost rod and a number of intermediate rods, each inner rod in each pair of adjacent rods being extendable from inside of an outer rod in the pair of adjacent rods. The number/length of rods can be chosen to give the desired stroke length of the mechanism.

Preferably, the telescopic rod is able to extend to a length that is at least 150% of its fully retracted configuration. More preferably, the telescopic rod is able to extend approximately double the length (200%) of its fully retracted configuration. For example, the telescopic rod may be able to extend from a length of approximately 300 mm to a length of approximately 700 mm. It may be possible for the telescopic rod to extend to significantly more than double the length of its fully retracted configuration. This allows the deployment mechanism to deploy the device to a position where it can shield a leading edge of a wing, for example from debris. Such a position may be at 120 degrees to the wing.

Preferably, the mechanism further comprises a ball screw actuator and ball bearings in the threaded portions of either of the inner and outer rods and wherein movement of the inner rod with respect to the outer rod of the telescopic rod is actuated by the ball screw actuator. Using a ball screw actuator allows precise control of the position of the auxiliary wing surface device. A ball screw actuator can be efficient, generate low levels of heat and be able to actuate the mechanism to deploy (and retract) quickly. In addition, a ball screw actuator can be designed to incorporate a brake (or brakes) so that the mechanism can hold high loads. The use of ball bearings in precisely manufactured threads (preferably, semi-circular threads) of the threaded portions improves the service life of the deployment mechanism.

Preferably, the ball screw actuator is provided with a brake for locking in the event of a failure.

Preferably, the mechanism comprises two ball screw actuators.

The mechanism may comprise a rotating shaft and gearing for powering the ball screw actuator. Rotational power can be efficiently delivered from the rotating shaft to the gearing. It is also possible to use gearing, for example a worm gear, which is able to lock in the event of a failure. Preferably, the deployment mechanism comprises a sensor for monitoring the rotation of the shaft.

Alternatively and preferably, the mechanism comprises an electric motor for powering the ball screw actuator. This eliminates the need for a rotational shaft and gearing. Hence, an electrical actuation system has a lower weight than a mechanical actuation system. An electrical actuation system also has a lower number of parts, giving an improved service life. Preferably, the deployment mechanism comprises a sensor, for example, a potentiometer, for monitoring the function of the electric motor.

Preferably, at least one of the first and second connector portions comprises a pivotable joint and a bracket. This allows the deployment mechanism to rotate to accommodate the changing position of the auxiliary wing surface device as it deploys.

According to a second aspect of the invention there is also provided an aircraft wing comprising a wing body, an auxiliary wing surface device and the deployment mechanism of any preceding claim, wherein the first connector portion is connected to the aircraft wing body, the second connector portion is connected to the auxiliary wing surface device and wherein the inner rod is extendable from inside of the outer rod to increase the length of the telescopic rod, such that the distance between the aircraft wing body and the auxiliary wing surface device can be increased.

Preferably, the auxiliary wing surface device is located at the leading edge of the aircraft wing.

Preferably, the auxiliary wing surface device is stowable within the aircraft wing to form part of the profile of the aircraft wing.

The auxiliary wing surface device may be a slat. Alternatively, the auxiliary wing surface device is a drooped nose device. Alternatively and preferably, the auxiliary wing surface device is a Krueger flap.

Preferably, a bracket of the first connector portion is attached to a spar, preferably a front spar, of the aircraft wing. This provides a load path from the auxiliary wing surface device directly to a significant structural component of the aircraft wing body.

Preferably, the bracket of the first connector portion is attached near to an upper cover of a wing box of the aircraft wing body. This is advantageous in terms of the structural support required for the mechanism.

Preferably, the aircraft wing further comprises a number of linkages between the auxiliary wing surface device and the aircraft wing body, the linkages defining the travel path of the auxiliary wing surface device in relation to the aircraft wing body when the length of the telescopic rod is increased.

Preferably, the linkages are connected to one or more ribs of the aircraft wing body. This is advantageous as the ribs are a significant structural component of the aircraft wing body.

Preferably, there is a first linkage for reacting lateral loads from the auxiliary wing surface device and a second linkage for reacting shear loads.

Preferably, the aircraft wing comprises a support structure attached to the auxiliary wing surface device, and wherein each of the two linkages is pivotally connected to the support structure.

Preferably, the two linkages are connected to the support structure at different positions such that their axes of rotation with respect to the auxiliary wing surface device are spaced apart. This allows both the position and the angle of the auxiliary wing surface device to be controlled by the linkages.

Preferably, the aircraft wing body comprises a pivot pin attached to one or more ribs of the aircraft wing body and wherein one of the linkages, preferably the first linkage, is connected so as to be pivotable around the pivot pin.

Preferably, the aircraft wing body comprises a support bracket attached to one or more ribs of the aircraft wing body and wherein one of the linkages, preferably the second linkage, is connected so as to be pivotably connected to the support bracket.

Preferably, the two linkages are pivotally connected to the aircraft wing body at different positions such that their axes of rotation with respect to the aircraft wing body are spaced apart.

According to a third aspect of the invention there is also provided an aircraft comprising the aircraft wing or deployment mechanism as described above.

According to a fourth aspect of the invention there is also provided a method of operating an aircraft, wherein the method comprises the steps of actuating a telescopic rod so that an inner rod of the telescopic rod extends from inside of an outer rod of the telescopic rod to increase the length of the telescopic rod, thereby increasing the distance between a first connector portion at a first end of the telescopic rod and a second connector portion at a second end of the telescopic rod, wherein the first connector portion is connected to the auxiliary wing surface device, and the second connector portion is connected to the aircraft wing body, and thereby deploying the auxiliary wing surface device from the aircraft wing body.

According to a fifth aspect of the invention there is also provided a method of operating an aircraft, wherein the method comprises the steps of actuating a telescopic rod so that an inner rod of the telescopic rod retracts inside of an outer rod of the telescopic rod to decrease the length of the telescopic rod, thereby decreasing the distance between a first connector portion at a first end of the telescopic rod and a second connector portion at a second end of the telescopic rod, wherein the first connector portion is connected to the auxiliary wing surface device, and the second connector portion is connected to the aircraft wing body, and thereby retracting the auxiliary wing surface device towards the aircraft wing body.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 1b shows an enlarged view of the deployment mechanism in FIG. 1a;

FIG. 2b shows an enlarged view of the deployment mechanism in FIG. 2a;

DETAILED DESCRIPTION

Figure 1A:
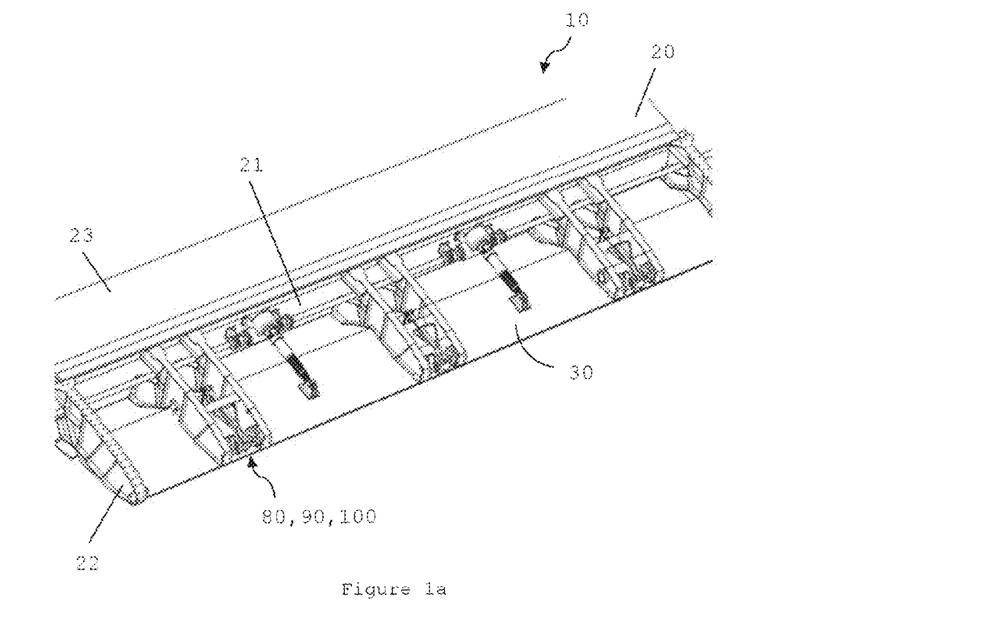
FIG. 1a shows a partially cut-away perspective view of part of an aircraft wing according to a first embodiment of the invention.

FIG. 1a shows a partially cut-away perspective view of part of an aircraft wing 10 according to a first embodiment of the invention. The aircraft wing 10 comprises an aircraft wing body 20 and a number of Krueger flaps 30 forming the lower leading edge of the aircraft wing 10.

The aircraft wing body comprises a front spar 21, an upper cover 23 and a lower cover (24, not shown in FIG. 1a). The aircraft wing body 20 also comprises a number of ribs 22, arranged in adjacent pairs, extending forwards from the front spar 21.

The aircraft wing 10 comprises a number of linkage systems 80, 90, 100 which will be described in more detail in relation to FIG. 4. Each linkage system 80, 90, 100 is located between a pair of adjacent ribs 22 and is used to control the movement path of one of the Krueger flaps 30.

The aircraft wing 10 also comprises a deployment mechanism 60 and actuation system for each Krueger flap 30. One of these is shown enlarged in FIG. 1b.

Figure 1B:
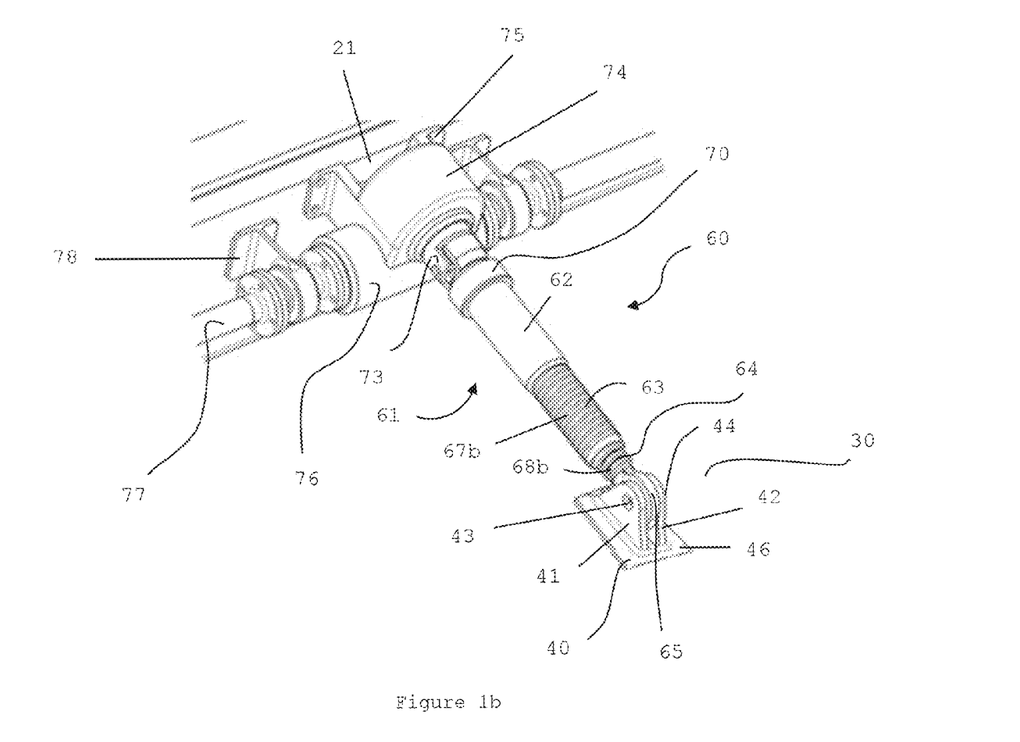

The deployment mechanism 60 comprises a telescopic rod 61, which is attached at a first end to a ball screw actuator 70 and at a second end to the Krueger flap 30.

The telescopic rod 61 comprises three sections; an outermost rod section 62, an intermediate rod section 63 and an innermost rod section 64. The outermost rod section 62 is attached to the ball screw actuator 70 at the first end of the telescopic rod 61. The outermost rod section 62 has an internally threaded portion (67a, not shown in FIG. 1b). The intermediate rod section 63 has a smaller diameter than the outermost rod section with an externally threaded portion 67b corresponding to the internally threaded portion 67a of the outermost rod section 62. The intermediate rod section 63 can be screwed in and out of the outermost rod section 62. The intermediate rod section 63 also has an internally threaded portion (68a, not shown in FIG. 1b). The innermost rod section 64 has a smaller diameter than the intermediate rod section with an externally threaded portion 68b corresponding to the internally threaded portion 68a of the intermediate rod section 63. The innermost rod section 64 can be screwed in and out of the intermediate rod section 63.

The innermost rod section 64 comprises a flat bulbous portion 65 at the second end of the telescopic rod 61. This bulbous portion 65 has a spherical bearing installed in a hole through it and is attached to a bracket 40 by a pin extending through the bulbous portion 65 and also through bushes installed in holes 43, 44 in two lugs 41, 42 of the bracket 40. Each lug 41, 42 is located either side of the bulbous portion 65 so that the bulbous portion 65 is pivotally mounted between the lugs 41, 42 of the bracket 40. The bracket 40 also comprises a flat base portion 46 that is attached to an interior surface 33 of the Krueger flap 30.

The ball screw actuator 70 (which will be described in more detail in relation to FIG. 3) is attached at its other end to a universal joint 73. The universal joint 73 is also attached to a gear housing 74. The gear housing is attached to the front spar 21 of the aircraft wing 10 by a bracket 75. Underneath the gear housing 74 is a worm gear 76 mounted on a rotational shaft 77. The rotational shaft 77 is mounted on the front spar 21 by brackets 78 and extends along in front of the front spar 21 and provides a rotational movement to the worm gear 76 for each deployment mechanism 60 in the wing 10. In addition, there is an optical sensor (not shown) at each end of the rotational shaft 77. The sensors monitor the function and position of the rotational shaft 77.

Figure 2A:
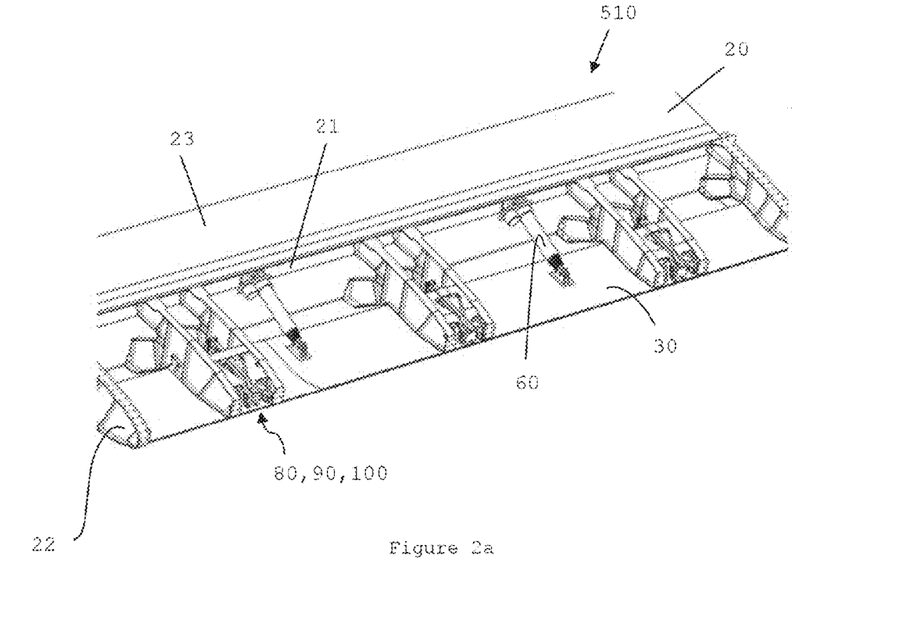
FIG. 2a shows a partially cut-away perspective view of part of an aircraft wing according to a second embodiment of the invention.

FIG. 2a shows a partially cut-away perspective view of part of an aircraft wing 510 according to a second embodiment of the invention. This second embodiment is similar to the first embodiment with the exception that the actuation system is different; while the first embodiment has a mechanical shaft 77 actuation system for actuating the ball screw actuator 70, the second embodiment uses an electrical motor 573 for doing so. In the figures and in the following description, like numerals will be used for like elements between the embodiments. Elements unique to or different in the second embodiment will be prefixed with "5".

The different elements of the actuation system of the second embodiment aircraft wing 510 will now be described in relation to FIG. 2b.

The ball screw actuator 70 is attached to a plate 575. The plate 575 is attached to a bracket 576, secured to the front spar 21. In addition, an electrical motor 573 is attached to the plate 575 and is electrically connected to the ball screw actuator 70. An electrical harness 574 connects the electric motor 573 to an electricity supply in the aircraft. In addition, there is a potentiometer (not shown) attached to the electrical motor 573 to monitor the function of the electrical motor 573 and/or ball screw actuator 70.

Figure 2B:
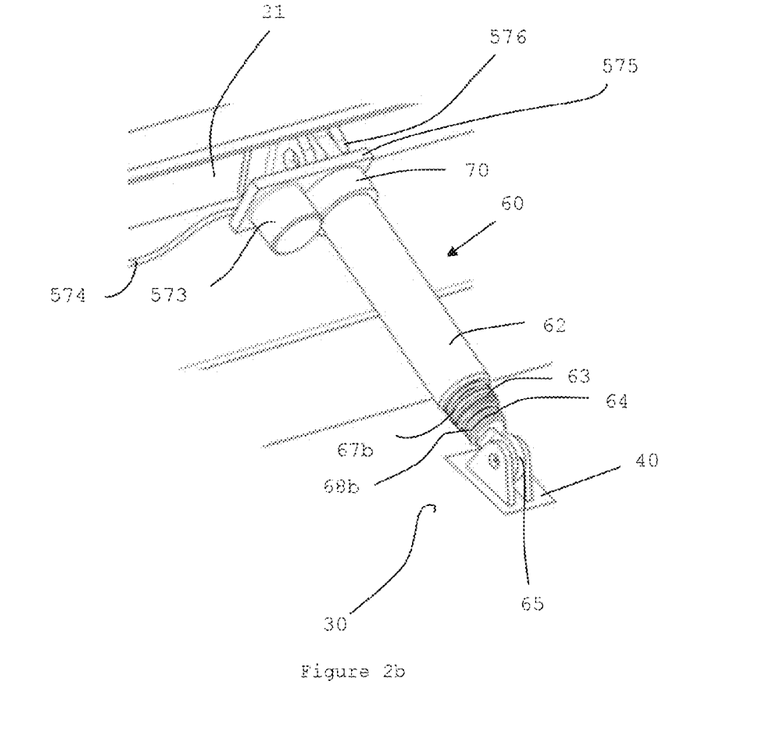

The deployment mechanism 60 shown in FIG. 2b is almost identical to that in FIG. 1a. However, the deployment mechanism 60 as shown in FIG. 2b has a longer outermost rod section 62 and so, for the same position of the Krueger flap 30, the intermediate 63 and innermost 64 rod sections have less length protruding from the outermost rod section 62. The outermost rod section 62 can be longer than in the first embodiment due to the electrical actuation system of the second embodiment being smaller than the mechanical actuation system of the first embodiment.

Figure 3:
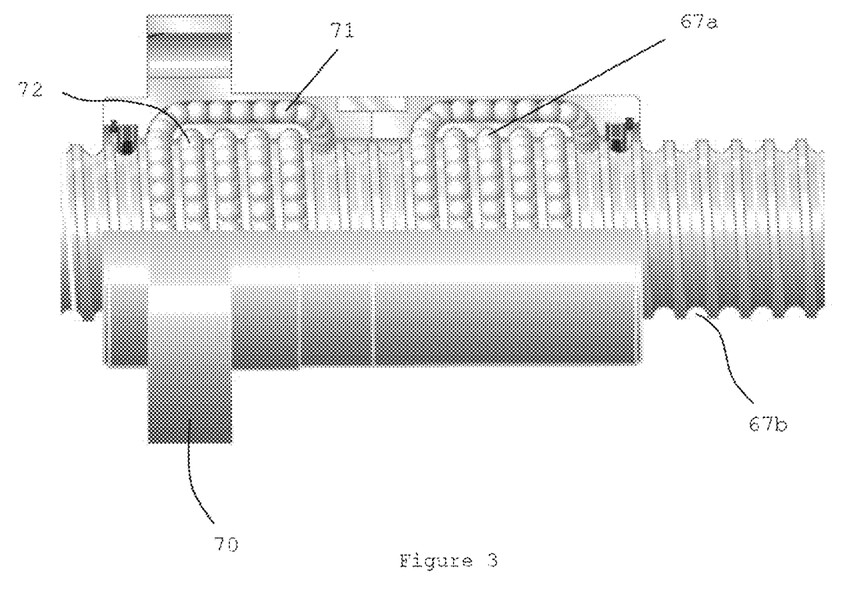
FIG. 3 shows a partially cut-away side view of the ball screw actuator in either the first or second embodiments.

FIG. 3 shows a partially cut-away side view of one ball screw actuator 70 in either the first or second embodiments. In each embodiment, there will actually be a second identical ball screw actuator present for each flap 30 in order to have a back-up actuator in case the first should fail. The ball screw actuator 70 comprises ball bearings 71 which fit into two sets of channels 72 formed between two internally threaded portions 67a of the outermost rod section 62 and the externally threaded portion 67b of the intermediate rod section 63. The ball bearings 71 fill up the two sets of channels and cause the intermediate rod section 63 to move in relation to the outermost rod section 62.

Figure 4:
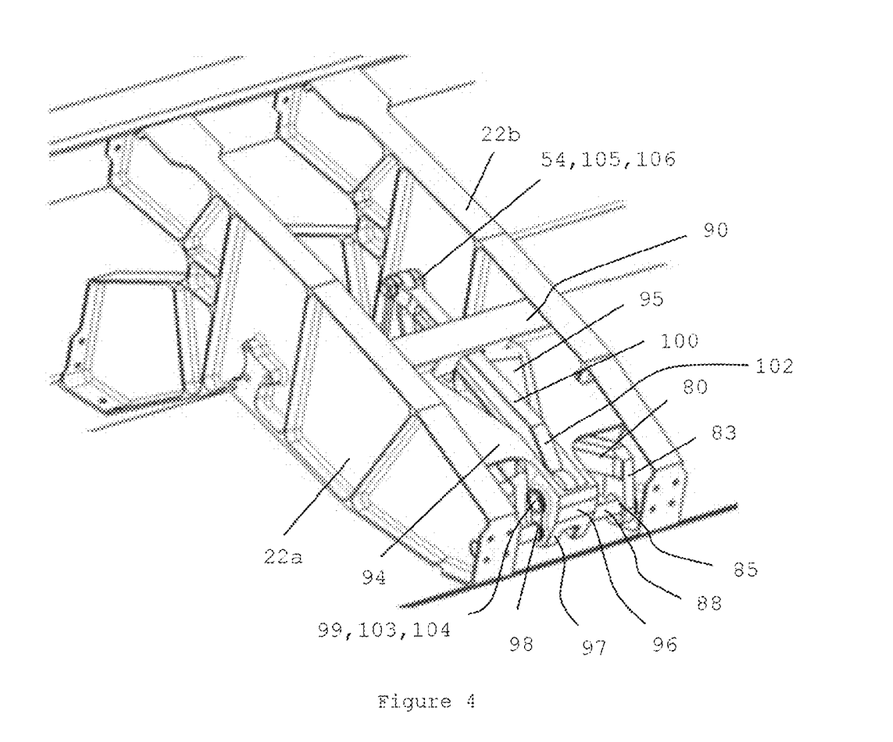
FIG. 4 shows a perspective view of the linkage system in either the first or second embodiments.

FIG. 4 shows a perspective view of the linkage system 80, 90, 100 in either the first or second embodiments. The linkage system comprises three components; an A-link 80, a support bracket 90 and an I-link 100.

The A-link 80 comprises an A-frame 81. The A-frame 81 is provided with two foot portions 82, 83 extending behind the "A" shape from the bottom of the two legs of the "A" shape. Each foot portion 82, 83 is provided with a hole 84, 85. A pin 88 is located through bushes in the two holes 84, 85 so that the pin 88 is parallel to but behind the bottom of the "A" shape. The pin 88 is fixed between a pair of adjacent ribs 22a, 22b at the leading edge of the aircraft wing 510. The A-frame 81 can pivot around the pin 88 and so can pivot with respect to the aircraft wing body 20. Adjacent to the top apex of the A-frame 81 is another bush installed in a hole 86 that is parallel to the bottom of the "A" shape. This hole 86 accommodates another pin 87. This pin 87 is attached to a supporting structure 50 of the Krueger flap 30, as will be described later. The A-link 80 is designed to react lateral loads from the Krueger flap 30.

The supporting bracket 90 comprises two side flanges 91, 92, each one being riveted 93 to an inner facing side of each of the adjacent pair of ribs 22a, 22b. The supporting bracket 90 has a top portion 94 with a central gap 95 in the top portion. The supporting bracket 90 also has a downwards facing foot portion 96 at the bottom centre of the supporting bracket 90. This foot portion 96 has two lugs 97, each with a hole 98 in. These two holes 98 accommodate the pin 88 so that the supporting bracket 90 helps to secure the pin 88 to the ribs 22. Adjacent to the holes 98 and slightly above them is another set of holes 99 through the foot portion 96. These holes 99 connect the I-link 100.

The I-link 100 comprises an I-beam 101 with a tail portion 102 that is slightly angled. At the end of the tail portion 102 is a hole 103. The I-link 100 is connected to the supporting bracket 90 by a pin 104 extending through a spherical bearing installed in the hole 103 in the I-link 100 and bushed installed in holes 99 in the supporting bracket 90. The I-beam can pivot about pin 104. At the non-tail end of the I-beam 101 is another hole 105 with a bearing installed in it. The hole 105 has an axis that is parallel to the pin 104. This hole 105 accommodates another pin 106. This pin 106 is attached to a supporting structure 50 of the Krueger flap 30, as will be described later. The I-link 100 is designed to react shear loads from the Krueger flap 30.

Figure 5A:
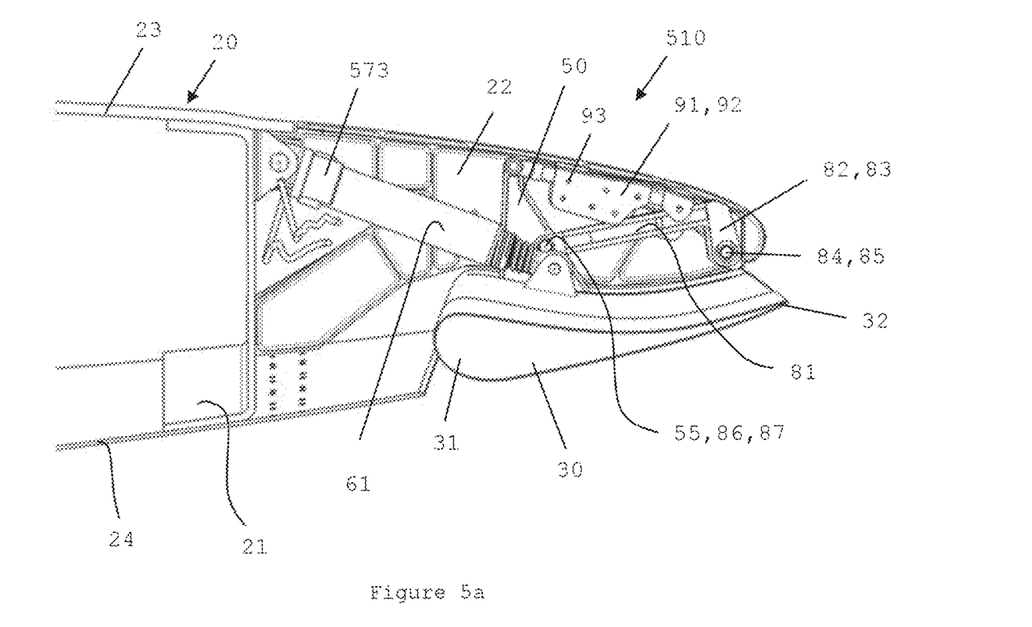
FIG. 5a shows a side view of part of the aircraft wing of FIGS. 2a and 2b, with the Krueger flap in a fully stowed position.
Figure 5B:
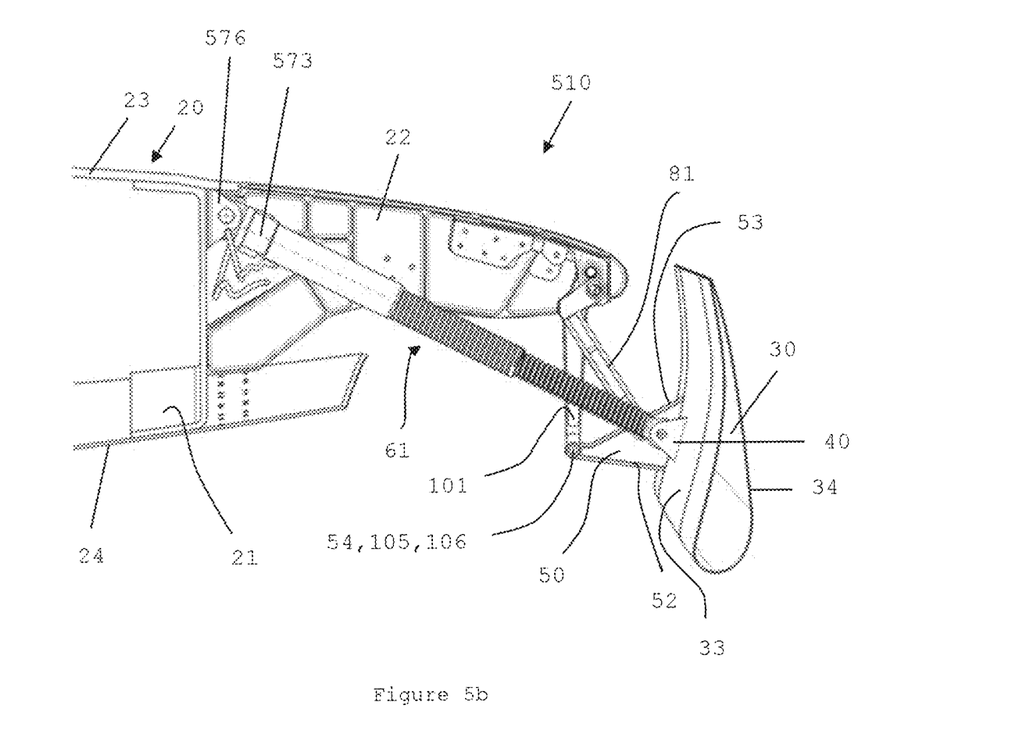
FIG. 5b shows a side view of part of the aircraft wing of FIGS. 2a and 2b, with the Krueger flap in a partially deployed position.
Figure 5C:
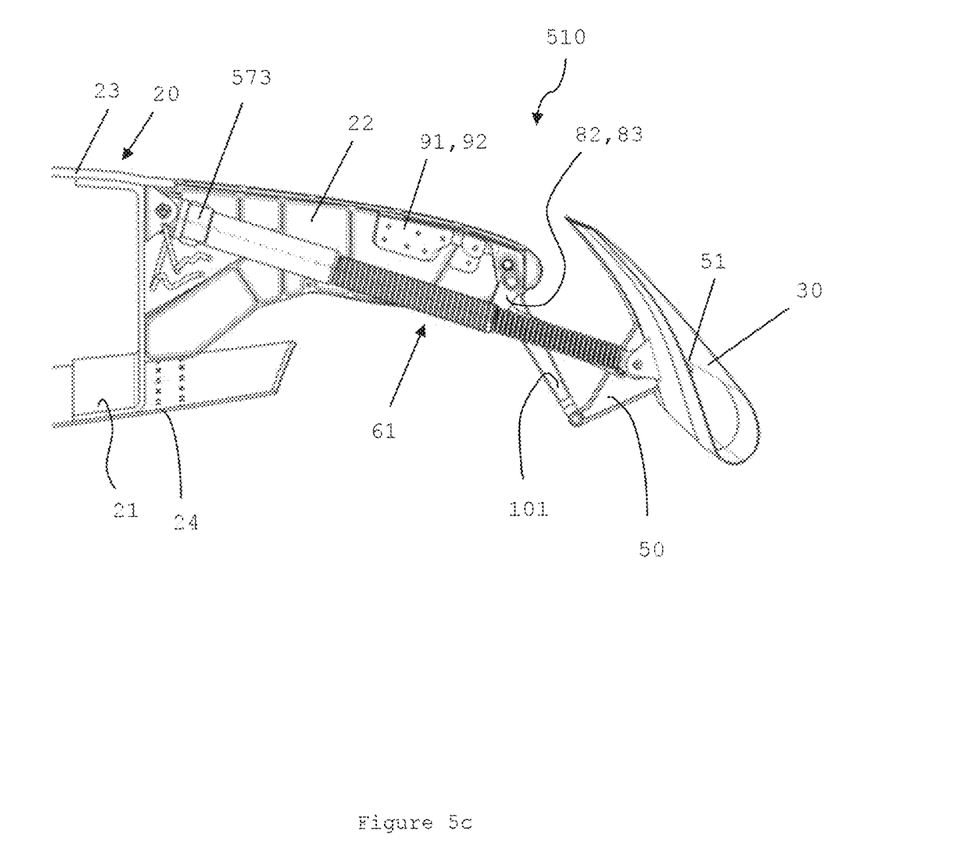
FIG. 5c shows a side view of part of the aircraft wing of FIGS. 2a and 2b, with the Krueger flap in a fully deployed position.

FIG. 5a shows a side view of part of the aircraft wing of FIGS. 2a and 2b, showing one Krueger flap 30 in a fully stowed position. FIG. 5b shows the Krueger flap 30 in a partially deployed position, and FIG. 5c shows the Krueger flap 30 in a fully deployed position.

In the partially deployed position of FIG. 5b, the Krueger flap is at approximately 90 degrees to the wing. Here, the Krueger flap can act as a brake.

The Krueger flap 30 and its supporting structure 50 will now be described in relation to these figures. Importantly, the Krueger flap 30 and its supporting structure 50 are the same as in the first embodiment and so the following description applies to the first embodiment too.

The Krueger flap 30 is in the shape of a cambered aerofoil with a bluff rounded end 31 and a tapered narrow end 32. As can be seen in FIG. 5a, when stowed, the flap 30 is stowed with its bluff end 31 towards the rear of the wing 510 and the tapered end 32 at the leading edge of the wing 510. An interior surface 33 of the flap 30 sits adjacent to the underside of the main wing body 20 with an exterior surface 34 forming the underside leading edge profile of the wing 510.

A supporting structure 50 for the Krueger flap 30 is in the form of a right-angled triangle beam. A short side 51 of the beam is placed inside the flap 30 so that it is abutting the inside of the exterior surface 34 of the flap 30. A longer side 52 of the beam that is at right angles to the short side 51 extends outwards from the flap 30 to the apex of the beam. A sloping side 53 of the beam extends from the apex in the direction of the tapered end 32 of the Krueger flap 30. At the apex of the beam is a hole 54 for accommodating pin 106 of the I-link 100 to allow the I-link to pivot with respect to the supporting structure 50 and Krueger flap 30. Approximately one third of the distance along the sloping side 53 from the apex is another hole 55 for accommodating pin 87 of the A-link 80 to allow the A-link to pivot with respect to the supporting structure 50 and Krueger flap 30.

In use, the Krueger flap 30 is moved in relation to the aircraft wing body 20 from a stowed position (in FIG. 5a), for example during cruise, to a fully deployed position (in FIG. 5c), for example for take-off and landing operations. In the stowed position, the Krueger flap 30 profile is blended with the leading edge lower profile of the aircraft wing 510 and so laminar flow along the wing is not disturbed. In the fully deployed position, the Krueger flap 30 provides an auxiliary wing surface in front of the leading edge of the aircraft wing body 20. This increases the lift co-efficient of the wing 510. In this fully deployed position, the Krueger flap is at approximately 120 degrees to the wing. Here, the Krueger flap can act as a shield for protecting the leading edge of the wing from debris, for example during take-off.

During take-off and landing, the Krueger flap 30 is in its fully deployed position (FIG. 5c). Once the aircraft has taken off and its speed has increased so that the auxiliary wing surface is no longer required, the Krueger flap 30 can be retracted into its stowed position. This is done by actuating either the electric motor 573 (in the second embodiment) or the rotational shaft 77 (in the first embodiment).

In the case of the first embodiment, the rotational shaft 77 causes the worm gear 76 to rotate and this causes the gear in the gear housing 74 to also rotate. This actuates the ball screw actuator 70.

In the second embodiment, the electric motor 573 actuates the ball screw actuator 70 directly.

In both embodiments, with the ball screw actuator 70 activated, the intermediate rod section 63 is retracted into the outermost rod section 62 and also the innermost rod section 64 is retracted into the intermediate rod section 63. This causes the Krueger flap 30 to be pulled backwards towards the front spar 21. This causes the linkages 80, 100 to pivot clockwise (as seen in FIGS. 5a to 5c) and thereby define the retraction travel path of the Krueger flap 30.

When the aircraft is approaching landing, the Krueger flap 30 can be re-extended into its deployed position. This is done by actuating either the electric motor 573 (in the second embodiment) or the rotational shaft 77 (in the first embodiment).

In the case of the first embodiment, the rotational shaft 77 is rotated in the opposite direction to during retraction, which causes the worm gear 76 to rotate in the opposite direction and this causes the gear in the gear housing 74 to also rotate in the opposite direction to before. This actuates the ball screw actuator 70 to deploy the flap 30.

In the second embodiment, the electric motor 573 actuates the ball screw actuator 70 to deploy the flap 30 directly.

In both embodiments, with the ball screw actuator 70 activated, the intermediate rod section 63 is extended out of the outermost rod section 62 and also the innermost rod section 64 is extended out of the intermediate rod section 63. This causes the Krueger flap 30 to be pushed forwards away from the front spar 21. This causes the linkages 80, 100 to pivot anti-clockwise (as seen in FIGS. 5a to 5c) and thereby define the extension travel path of the flap 30.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

As a variation to the first embodiment, there may be more than one rotational shaft 77. For example, there may be one rotational shaft 77 for each Krueger flap 30 or one rotational shaft for each deployment mechanism 60.

Also, instead of having an optical sensor at each end of the rotational shaft 77 for monitoring the function and position of the rotational shaft 77, a magnetic sensor at each end of the rotational shaft 77 may be used.

As a variation to both embodiments, the Krueger flap 30 may also be deployed (or at least partially deployed) during cruise flight of the aircraft to act as an air brake.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing comprising:
   a wing body;
   an auxiliary wing surface device,
   linkages between the auxiliary wing surface device and the wing body, the linkages defining a travel path of the auxiliary wing surface device in relation to the wing body and the linkages include a first linkage configured to react to lateral loads applied by the auxiliary wing surface device and a second linkage configured to react to shear loads applied by the auxiliary wing surface device, and
   a deployment mechanism for deploying the auxiliary wing surface device from the wing body along the travel path, wherein the deployment mechanism includes:
      a first connector portion for connecting the deployment mechanism to the wing body,
      a second connector portion for connecting the deployment mechanism to the auxiliary wing surface device, and
      a telescopic rod assembly linking the first and second connector portions, wherein the telescopic rod assembly comprises an inner rod and an outer rod, wherein the inner rod is extendable from inside of the outer rod to increase the length of the telescopic rod assembly and thereby increase a distance between the first and second connector portions, wherein the increase of the distance between the first and second connector portions increases a distance between the wing body and the auxiliary wing surface device and causes the auxiliary wing surface device to deploy along the travel path.

2. The aircraft wing in claim 1, wherein the outer rod has an internally threaded portion corresponding to an externally threaded portion of the inner rod, such that the inner rod is extendable from inside the outer rod by a screw action of the threaded portions.

3. The aircraft wing in claim 1, wherein the telescopic rod further comprises an intermediate rod extendable from inside of the outer rod and from which extends the inner rod.

4. The aircraft wing in claim 1, wherein the deployment mechanism further comprises a ball screw actuator and ball bearings in a threaded portions of either of the inner and outer rods, and wherein movement of the inner rod with respect to the outer rod of the telescopic rod is actuated by the ball screw actuator.

5. The aircraft wing in claim 4, wherein the deployment mechanism comprises a rotating shaft and gearing for powering the ball screw actuator.

6. The aircraft wing in claim 4, wherein the deployment mechanism comprises an electric motor for powering the ball screw actuator.

7. The aircraft wing in claim 1, wherein at least one of the first and second connector portions comprises a pivotable joint and a bracket.

8. The aircraft wing as claimed in claim 1, wherein the auxiliary wing surface device is located at a leading edge of the aircraft wing.

9. The aircraft wing as claimed in claim 8, wherein the auxiliary wing surface device is a Krueger flap.

10. The aircraft wing as claimed in claim 1, wherein a bracket of the first connector portion is attached to a spar of the aircraft wing.

11. The aircraft wing as claimed in claim 1, wherein the linkages are connected to one or more ribs of the wing body.

12. The aircraft wing as claimed in claim 1, wherein the aircraft wing further comprises a support structure attached to the auxiliary wing surface device, and wherein each of the first and second linkages is pivotally connected to the support structure.

13. The aircraft wing as claimed in claim 12, wherein the first and second linkages are connected to the support structure at different positions such that axes of rotation of the first and second linkages with respect to the auxiliary wing surface device are spaced apart.

14. The aircraft wing as claimed in claim 1, wherein the wing body comprises a pivot pin attached to one or more ribs of the wing body and wherein one of the linkages is connected to be pivotable around the pivot pin.

15. An aircraft wing as claimed in claim 1, wherein the wing body comprises a support bracket attached to one or more ribs of the wing body and wherein one of the linkages is pivotably connected to the support bracket.

16. The aircraft wing as claimed in claim 1, wherein the first and second linkages are pivotally connected to the wing body at different positions such that axes of rotation of the first and second linkages with respect to the wing body are spaced apart.

17. An aircraft comprising the aircraft wing of claim 1.

18. A method of operating an aircraft, wherein the method comprises:
   actuating a telescopic rod assembly so that an inner rod of the telescopic rod assembly extends from inside of an outer rod of the telescopic rod to increase a length of the telescopic rod assembly, thereby increasing a distance between a first connector portion at a first end of the telescopic rod assembly and a second connector portion at a second end of the telescopic rod assembly, wherein the first connector portion is connected to an auxiliary wing surface device, and the second connector portion is connected to a wing body, the actuation of the telescopic rod deploys the auxiliary wing surface device from the wing body along a travel path, and constraining the deployment of the auxiliary surface device from the wing body to a travel path defined by a first linkage and a second linkage each extending from the auxiliary wing surface device to the wing body, wherein the first linkage reacts to lateral loads from the auxiliary wing surface device and the second linkage reacts to shear loads from the auxiliary wing surface device.

19. A method of operating an aircraft, wherein the method comprises:

actuating a telescopic rod assembly so that an inner rod of the telescopic rod assembly retracts inside of an outer rod of the telescopic rod assembly to decrease a length of the telescopic rod assembly, thereby decreasing a distance between a first connector portion at a first end of the telescopic rod assembly and a second connector portion at a second end of the telescopic rod assembly, wherein the first connector portion is connected to an auxiliary wing surface device of the aircraft, and the second connector portion is connected to a wing body of the aircraft, retracting, by the actuation of the telescopic rod, the auxiliary wing surface device towards the wing body, and constraining the retraction of the auxiliary surface device to the wing body to a travel path defined by a first linkage and a second linkage each extending from the auxiliary wing surface device to the wing body, wherein the first linkage reacts to lateral loads from the auxiliary wing surface device and the second linkage reacts to shear loads from the auxiliary wing surface device.

* * * * *